United States Patent
Lange et al.

(12) 
(10) Patent No.: US 6,236,958 B1
(45) Date of Patent: May 22, 2001

(54) METHOD AND SYSTEM FOR EXTRACTING PAIRS OF MULTILINGUAL TERMINOLOGY FROM AN ALIGNED MULTILINGUAL TEXT

(75) Inventors: Jean-Marc Lange, Saint-Denis; Eric Gaussier, Grenoble, both of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,638

(22) Filed: May 15, 1998

(30) Foreign Application Priority Data

Jun. 27, 1997 (EP) .................................................. 97480038

(51) Int. Cl.[7] ..................................................... G06F 17/28
(52) U.S. Cl. ................................................. 704/8; 707/536
(58) Field of Search ..................................... 704/8, 2, 3, 4, 704/5, 6, 7, 9, 10, 1; 707/530, 531, 532, 533, 536

(56) References Cited

U.S. PATENT DOCUMENTS

| | | | |
|---|---|---|---|
| 5,418,717 | * 5/1995 | Su et al. | 704/9 |
| 5,477,450 | * 12/1995 | Takeda et al. | 704/2 |
| 5,477,451 | * 12/1995 | Brown et al. | 704/9 |
| 5,510,981 | * 4/1996 | Berger et al. | 704/2 |
| 5,541,836 | * 7/1996 | Church et al. | 204/7 |
| 5,608,622 | * 3/1997 | Chruch et al. | 704/3 |
| 5,696,980 | * 12/1997 | Brew | 704/273 |
| 5,850,561 | * 12/1998 | Church et al. | 707/532 |
| 5,867,811 | * 2/1999 | O'Donoghue | 704/1 |
| 5,893,134 | * 4/1999 | O'Donoghue et al. | 707/536 |
| 5,907,821 | * 5/1999 | Kaji et al. | 704/4 |

FOREIGN PATENT DOCUMENTS 40-2112065 * 4/1990 (JP) .

OTHER PUBLICATIONS

DIALOG File 144, Acc. No. 00792409: G.E. Bennington, "An Efficient Minimal Cost Flow Algorithm", Management Science, vol. 19, No. 9, pp. 1042–1051 (Abstract only provided), 1973.*

* cited by examiner

*Primary Examiner*—Joseph Thomas
(74) *Attorney, Agent, or Firm*—Manny W. Schecter (57) ABSTRACT

A terminology extraction system which allows for automatic creation of bilingual terminology has a source text which comprises at least one sequence of source terms, aligned with a target text which also comprises at least one sequence of target terms. A term extractor builds a network from each source and target sequence wherein each node of the network comprises at least one term and such that each combination of source terms is included within one source node and each combination of target terms is included within one target node. The term extractor links each source node with each target node, and through a flow optimization method selects relevant links in the resulting network. Once the term extractor has been run on the entire set of aligned sequences, a term statistics circuit computes an association score for each pair of linked source/target terms, and finally the scored pairs of linked source/target term that are considered relevant bilingual terms are stored in a bilingual terminology database. The whole process can be iterated in order to improve the strength of the bilingual links.

15 Claims, 10 Drawing Sheets

| English Term |
| --- |
| satellite communications |
| frequency bands |
| telephony |
| television |
| data transmission |
| operating fss telecommunication links |
| techno-economic |
| planning |
| antenna |
| link budget calculations |
| traffic capacity |
| satellite transponder |
| intermodulation products |
| satellite antenna |
| frequency band allocation |
| service area |
| frequency re-use |
| multiplexing |
| time division |
| modulation |
| earth station |
| frequency division multiple access |
| time division multiple access |
| space segment |

FIG. 9b

| French Term |
|---|
| télécommunications par satellite |
| bandes de frequences |
| téléphonie |
| television |
| transmission de donnees |
| exploiter des liaisons de télécommunications du sfs |
| technico-économique |
| planification |
| antenne |
| calcul de bilans de liaison |
| capacité de trafic |
| répéteur de satellite |
| produits d' intermodulation |
| antenne de satellite |
| attribution de bandes de fréquences |
| zone de service |
| reutilisation des fréquences |
| multiplexage |
| répartition dans le temps |
| modulation |
| station terrienne |
| accés multiple par répartition en fréquence |
| accés multiple par répartition dans le temps |
| secteur spatial |

US 6,236,958 B1

METHOD AND SYSTEM FOR EXTRACTING PAIRS OF MULTILINGUAL TERMINOLOGY FROM AN ALIGNED MULTILINGUAL TEXT

TECHNICAL FIELD

The present invention relates to a method and apparatus for creating bilingual terminology. Specifically, the invention relates to machine translation systems, terminology management systems, and any other systems which make use of multilingual terminology.

BACKGROUND ART

Identification of multilingual terminology can be seen as a process whereby a unit of text U1 (a word or sequence of words) in a source text T1 is put in correspondence with a related unit U2 in a target text T2 that is the translation of T1, such as U2 is the translation of U1. In the past, this process was a manual operation performed by human terminologists in order to build terminology databases. The automation of such a process is commonly referred to as alignment.

Alignment is usually performed through statistical methods. The article of Brown et al. (June 1991) titled "Aligning sentences in parallel corporal", Proceedings of the 29th Annual Meeting of the Association for Computational Linguistics, Berkeley, Calif., discloses a method wherein association scores are computed between the text units in different languages, and then the optimal combination of multilingual text units based on these scores is selected.

The drawbacks of such methods are that noise and silence are generated. Noise relates to multilingual associations which are found but are either wrong or not relevant, such as (dog,aboyer), where "aboyer" (to bark) is indeed related to dogs but is not a translation of the word "dog", while silence relates to some otherwise relevant multilingual associations which are present in the text but not found.

Furthermore alignment can be processed at different levels of the text depending on the size of the text units that are to be aligned, e.g. it can be done at the level of files, paragraphs, sentences, phrases, multiword terms or even single words.

Known systems that perform alignment of words or multiword terms generally rely upon the existence of texts that are already aligned at sentence level.

UK Patent Application 2,279,164 discloses a system for processing a bilingual database wherein aligned corpora (i.e. collections of texts) are generated or received from an external source. Each corpus comprises a set of text portions aligned with corresponding portions of the other corpus so that aligned portions are nominally translations of one another in two natural languages. A statistical database is compiled. An evaluation module calculates correlation scores for pairs of words chosen one from each corpus. Given a pair of text portions (one in each language) the evaluation module combines word pair correlation scores to obtain an alignment score for the text portions. These alignment scores can be used to verify a translation and/or to modify the aligned corpora to remove improbable alignments. The invention employs statistical techniques, and in particular embodiments allows a probability-based score to be derived to measure the correlation of bilingual word pairs.

However, this technique is limited to the alignment of single words, one word in the source language and one word in the target language. And it suffers the aforementioned problem of noise and silence related to the use of certain statistical scores.

Different methods have been proposed for the alignment at the multiword terms level. Gaussier et al., in "Some methods for the extraction of bilingual terminology", Proceedings of New Methods in Language Processing, Manchester, 1994, describe several alignment methods based on a monolingual identification of the multiword terms (e.g. by identifying words that have a high likelihood to be associated together), followed by the identification of biligual correspondences between these multiword terms through statistical scores. However, use of these methods is limited to terms composed of exactly two words in the source and target languages.

Some systems eliminating the aforementioned limitation use simple grammars in order to identify multiword terms in each language. For example, the paper of Gaussier et al. (1994) describes a system using linguistic patterns such as "adjective+noun" or "noun+preposition+noun" that characterize the structure of nominal terms in English and French.

While addressing the previous problem, the efficiency of such systems is not maximum and noise is generated because only a small portion of the noun-phrases thus identified turn out to be terms, i.e. units which express a concept of the domain. For example, the expression "following page" could be extracted as being a term in a "adjective+noun" grammar, while it is clear that this is a pervasive phrase in any technical text.

Furthermore, some silence is also generated since the scope of the linguistic patterns is limited to a certain number of expressions and will ignore certain structures that can yield terms, either because they are nonstandard word combinations (such as antenne parabolique de réception in French, where the adjective parabolique is masking the original noun+prep+noun, antenna de réception) or because the grammar failed to identify certain word part-of-speech due to the amibguity of certain words (for example microphone gain could be missed should the grammar consider gain as a verb instead of a noun).

Finally, among the cited problems of each method, none of the previous systems allow for the extraction of a one-to-many term alignment, such as for example the term "baseband" in English corresponding to the term "bande de base" in French.

Accordingly, it would be desirable to be able to provide a new system for automatically extracting multilingual terminology which eliminates the aforementioned problems.

SUMMARY OF THE INVENTION

It is an object of the invention to improve over existing bilingual word or term extraction methods and systems by taking into account different term lengths and by improving the accuracy of the extraction.

It is another object of the invention to provide a system and a method for automatically creating multilingual terminology. The above objects are achieved by employing a computer based terminology extraction system for creating bilingual terminology from a source text aligned with a target text.

The source text comprises at least one sequence of source terms, a term being composed of at least one word, and the target text comprises at least one sequence of target terms. The system comprises a term extractor means which operates on at least one pair extracted from the aligned texts and consisting of a source sequence aligned with a target sequence. The system is characterized in that the term extractor means comprises means for building a network wherein each node of the network comprises at least one term from the pair of aligned source/target sequences, and such that any source term is included within one source node, whereas each target term is included within one target node. The term extractor also comprises means for linking each node consisting of at least one source term with each node consisting of at least one target term. A term statistics means is coupled to the term extractor means for computing an association score for each pair of linked source/target terms, and a memory means is coupled to the term statistics means for storing the scored pairs of linked source/target terms that are considered relevant bilingual terms.

In order to select some links which correspond to potential bilingual terms, in a preferred embodiment the system further comprises means for operating a flow optimization algorithm, such that each link between a source node and a target node is characterized by a capacity and a flow, and such that these means allow for the selection of preferred links having maximum flow at minimum cost.

For a text having a plurality of sequences of source terms aligned with sequences of target terms, the method is operated successively on each pairs of sequences with the following steps of:

a) reading a first pair of aligned sequences of source and target terms;

b) building a network wherein each node comprises at least one term from said first pair of aligned source/target sequences, such that any combination of source terms is included within one node and any combination of target terms is included within one node;

c) linking each node consisting of at least one source term with each node consisting of at least one target term;

d) computing an association score for each pair of linked source and target nodes;

e) selecting at least one link such that the corresponding source/target linked terms are considered relevant bilingual terms;

f) storing the relevant bilingual terms and the corresponding association score;

g) repeating steps a) to f) for all pairs of aligned sequences.

After the last sequence is processed, alignment statistics are computed for all the stored bilingual terms according to a scoring function. The final selection of relevant bilingual terms is made according to the result of these alignment statistics.

In particular embodiments, in order to improve the final selection of relevant bilingual terms pairs, the whole process can be iterated several times over the entire corpus of text, the final selection of term pairs resulting from an iteration being used to modify the initial conditions of the following iteration. In one such embodiment, the word alignment statistics which enter in the computation of term association scores are updated before the following iteration. In another such embodiment, the relevant term pairs resulting from one iteration are not used as network nodes during the network building steps in the following iteration. For each of these embodiments, the iterations are carried along until an end criterion is met.

The claimed system and method may be used in many areas which may benefit from bilingual words or terms lexicons, including foreign language teaching, multilingual terminological work, multilingual dictionary compiling, human-assisted machine translation, or machine-aided human translation, to name a few. The preferred embodiment of the present invention relates to machine-aided translation. However, it is understood that many other areas will benefit from the claimed system and method of the present invention.

DETAILED DESCRIPTION OF THE INVENTION

Figure 1:
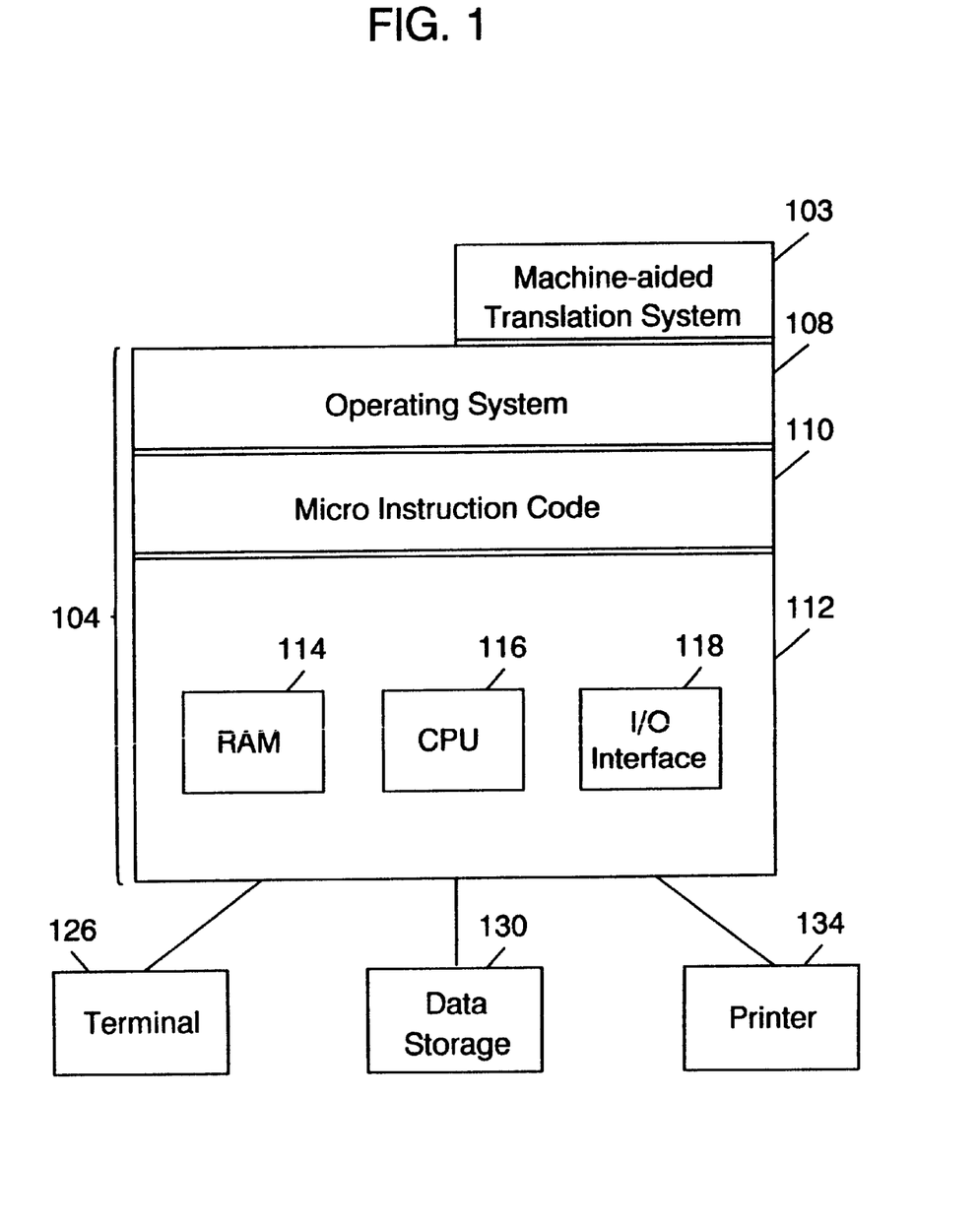
FIG. 1 is an illustration of a computer system including a machine-aided translation system.

Referring now to the drawings, and more particularly to FIG. 1, an environment in which a preferred embodiment of the present invention operates is illustrated. The preferred embodiment of the present invention operates on a computer platform 104. The computer platform 104 includes certain hardware units 112 including one or more central processing units (CPU) 116, a random access memory (RAM) 114, and an input/output (IO) interface 118. The computer platform 104 includes an operating system 108, and may include microinstruction code 110. A machine-aided translation system 103 may be part of the microinstruction code 110 or an application program to be executed via the operating system. Various peripheral components may be connected to the computer platform 104, such as a terminal 126, a data storage device 130, and a printing device 134.

Those skilled in the art will readily understand that the invention may be implemented within other systems without many changes.

Figure 2:
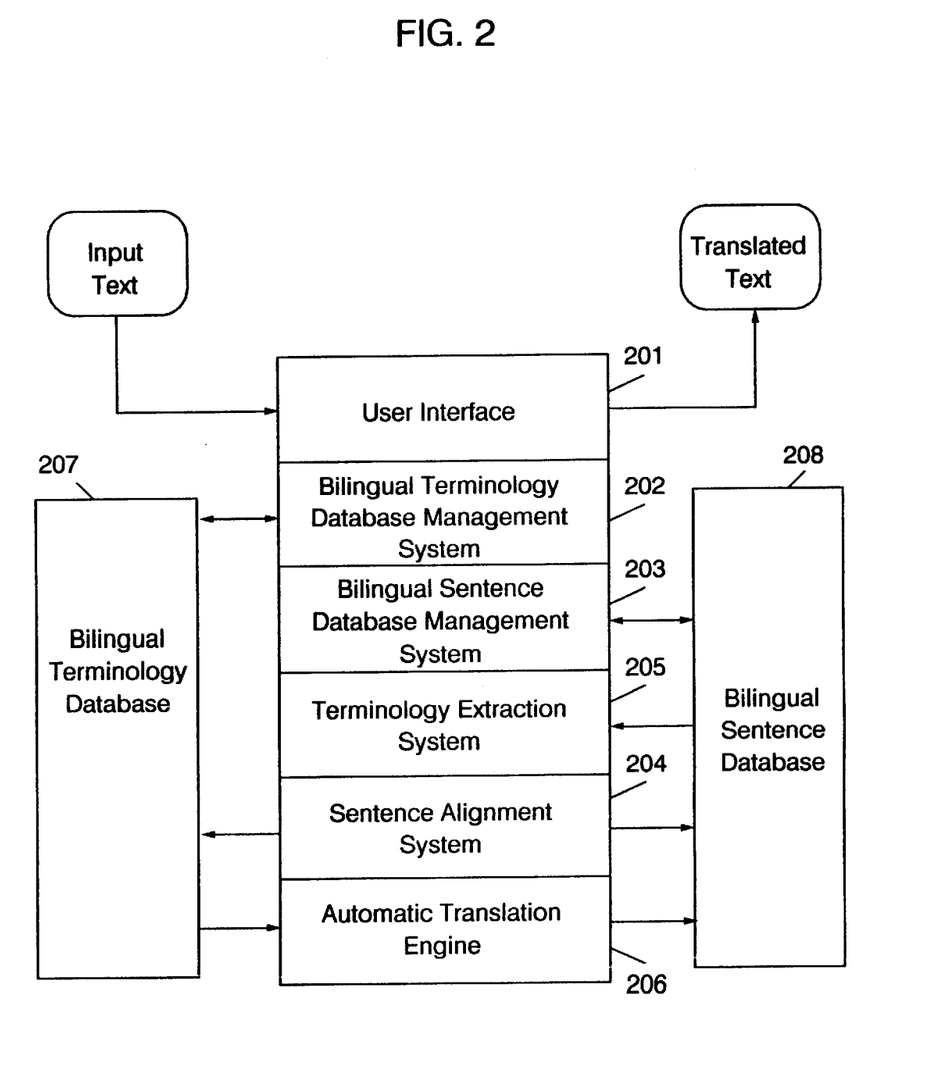
FIG. 2 illustrates a more detailed description of the machine-aided translation system, incorporating the terminology extraction component.

FIG. 2 illustrates a more detailed description of the machine-aided translation system 103. A user interface 201 may include a text editor for inputting manual translation of a source text, or for editing an automatic translation of said text. The user interface is coupled to a bilingual terminology database management system 202, to a bilingual sentence database management system 203, to a bilingual sentence alignment system 204, to a bilingual terminology extraction system 205, and to an automatic translation engine 206.

A bilingual terminology database 207 which stores the source terms and their appropriate translation is connected to the bilingual terminology extraction system 205 to receive the term pairs. However, it can be fed manually through the bilingual terminology database management system 202 by an operator.

A bilingual sentence database 208 contains aligned sentences (source sentence and corresponding target sentence) obtained from one or several source texts and their corresponding translations. It can be fed either by the user when manually inputting translations, or through the bilingual sentence alignment system 204, or through the automatic translation engine 206.

The bilingual terminology extraction system 205 is connected to the bilingual sentence database 208 for inputting bilingual aligned sentences therefrom. However those skilled in the art understand that the invention is not limited to the use of a bilingual sentence database to supply the extractor with bilingual pairs and other source and target structures such as groups of words of any length, may be input to the extractor.

The bilingual terminology extraction system 205 is also connected to the bilingual terminology database 207 for outputting bilingual pairs of words or multiword terms automatically produced by the terminology extraction system.

Figure 3:
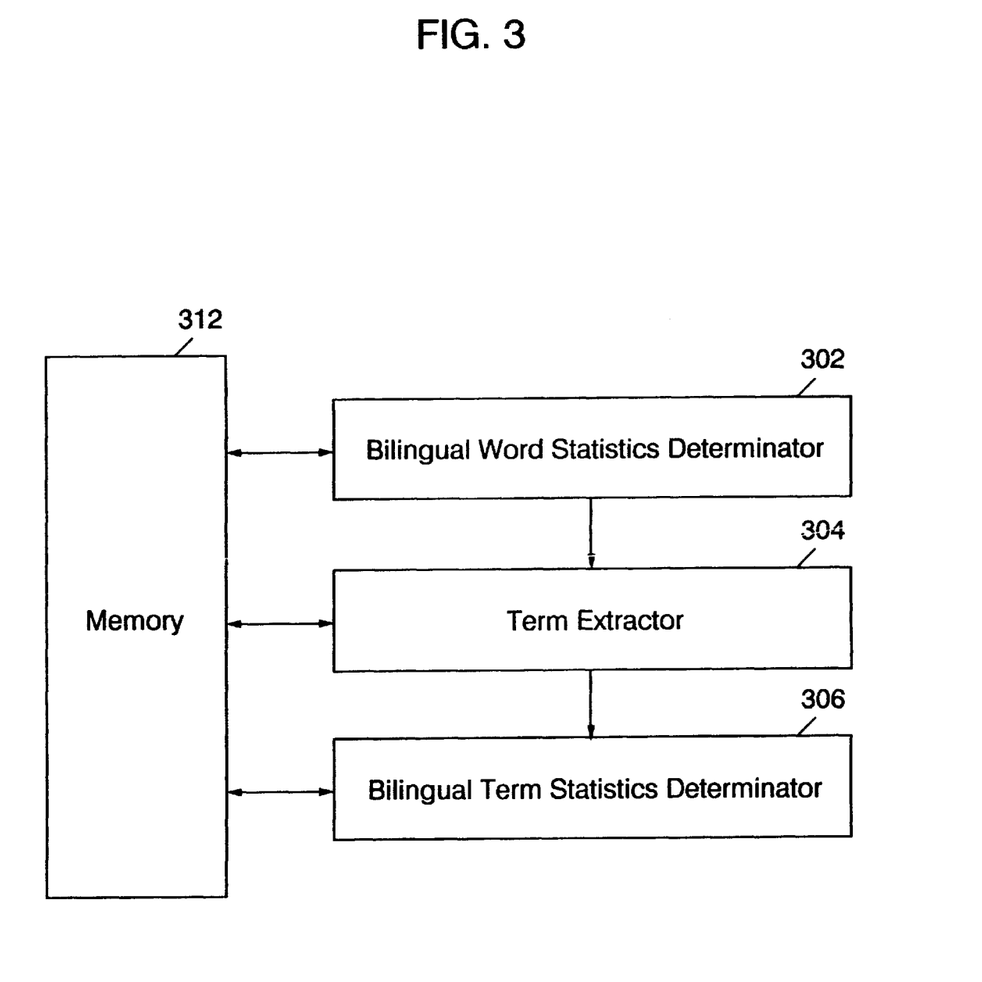
FIG. 3 is a flowchart illustrating the overall operation of the terminology extraction component.

FIG. 3 illustrates a mere detailed description of the bilingual terminology extraction system 205. Memory device 312 can be one or a combination of more than one data storage devices, e.g. floppy disks cr random access memory (RAM). The preferred embodiment of the invention uses a computer's internal random access memory (RAM) as the memory device 312. A bilingual word statistics determinator 302 is coupled to the memory device 312 and to term extractor 304. The term extractor 304 is coupled to the memory device 312 and to a bilingual term statistics determinator 306, the latter being connected to the memory device 312.

Figure 4:
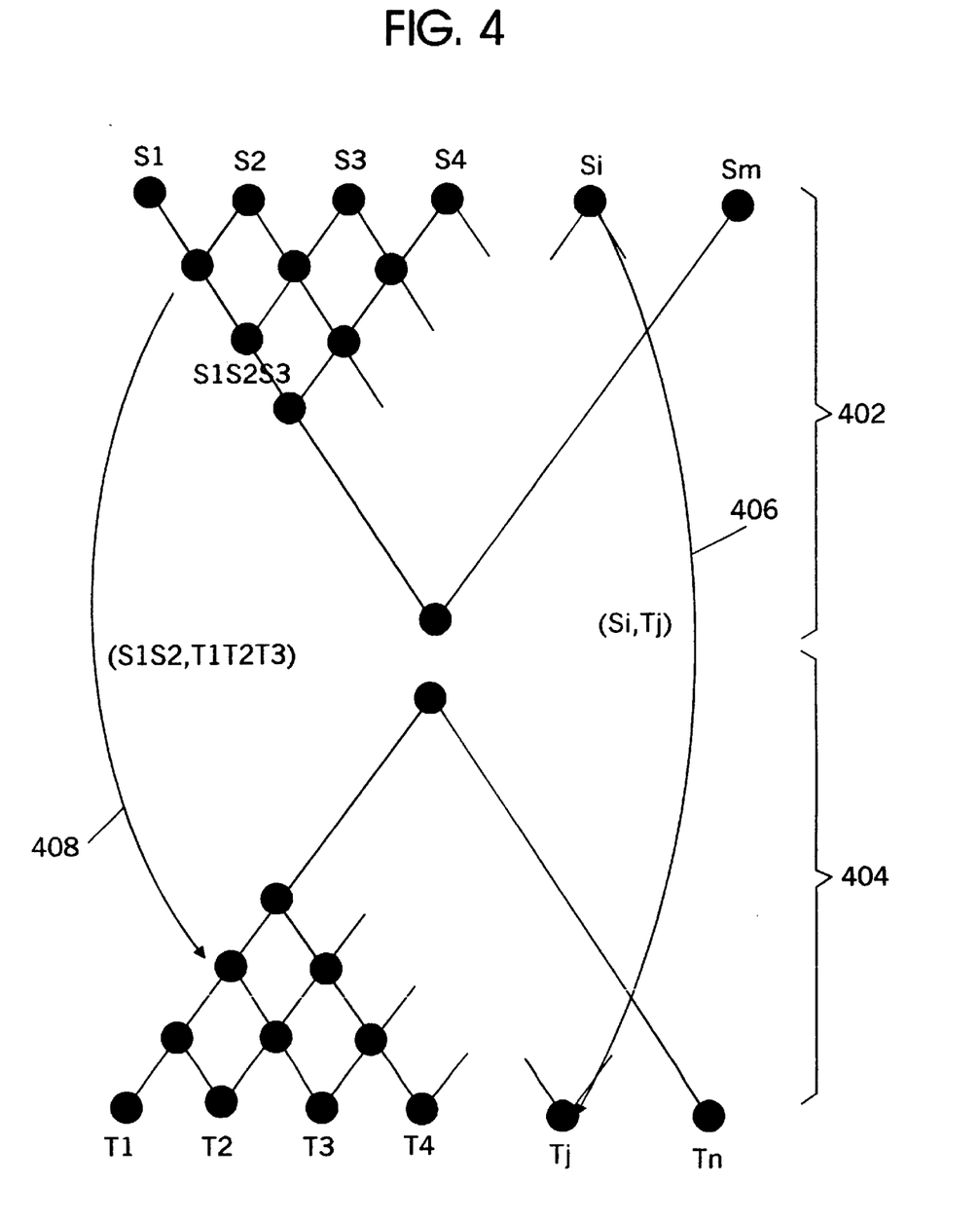
FIG. 4 is an illustration of the network built between a pair of bilingual sentences, and the arcs between words or terms in these sentences.
Figure 5:
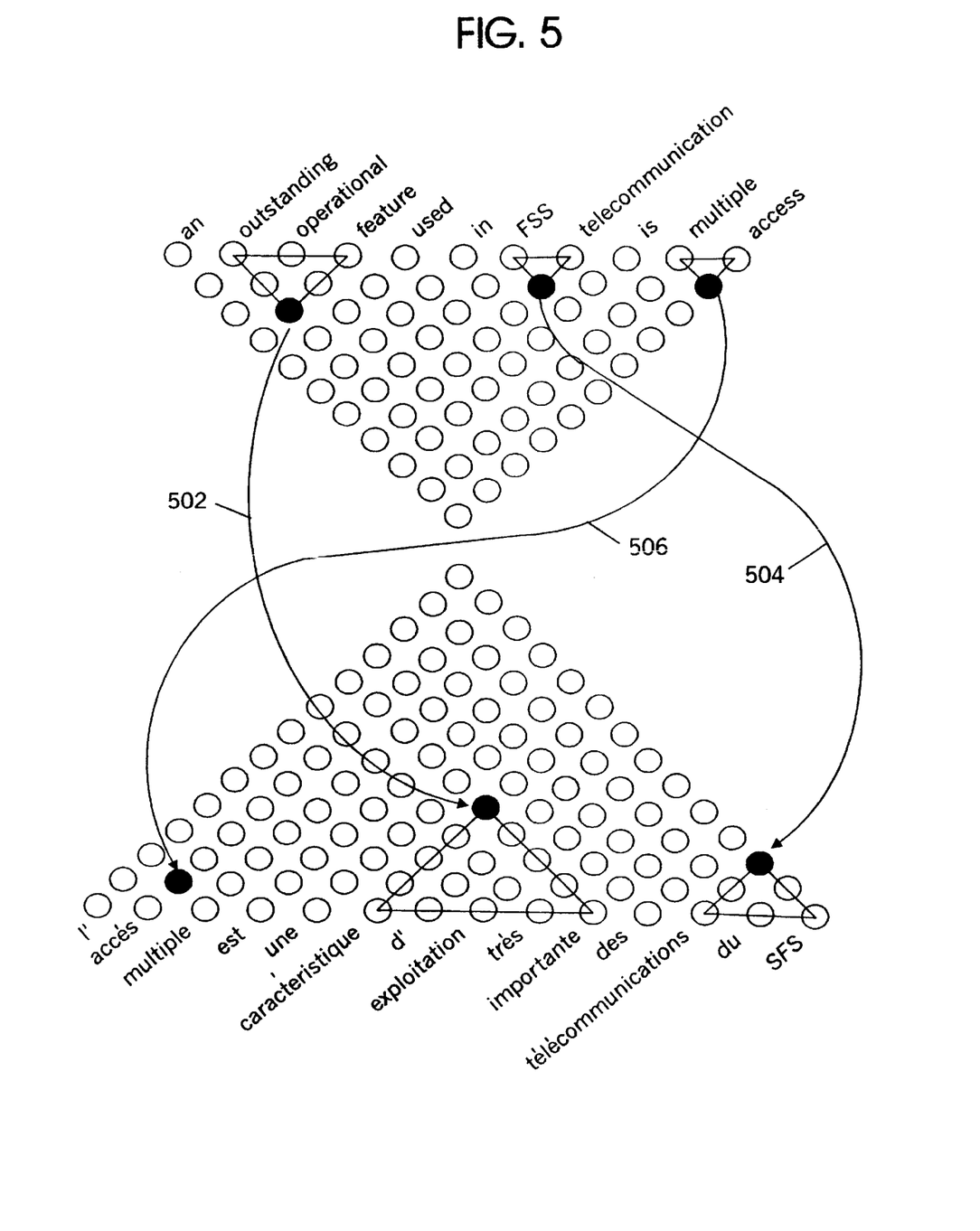
FIG. 5 illustrates a particular instance of this network for a bilingual pair of specific sentences.

Before detailing each component of FIG. 3 and the method to operate them, FIGS. 4 and 5 are first described as they illustrate the concept of network of the invention.

In the present invention, a bilingual pair of aligned sentences is transferred into the bilingual terminology extraction system 205. The aligned sentences are then modeled as a network of nodes in order to be processed.

FIG. 4 is a partial view of a network composed with the nodes of both the source sentence and the target sentence. All the nodes relating to the source sentence are represented in a first area 402. Similarly, all the possible nodes relating to the target sentence are represented in a second area 404. Each word and each sequence of words of the source sentence as well as each word and each sequence of words of the target sentence are represented by a unique node in the network.

Describing the first area 402, a drawn representation of the source network is illustrated as a triangle in which the base is composed with as many nodes (S1 through Sm) as the number of words in the source sentence. Each node Si of the base represents a single word of the source sentence, while the apex of the triangle represents the full sequence of words (S1SiSm). The intermediate nodes represent multi-words and are both apex nodes and base nodes for several sub-triangles. For example, node S1S2S3 as shown on FIG. 4 is the apex of triangle which base is (S1,S2,S3) and for triangle which base is (S1S2,S2S3). Furthermore, node S1S2S3 is also a base node for all sub-triangles built from S1S2S3.

On the lower half of FIG. 4, a second triangle (404) models the target network. Similarly, the base of this triangle is composed with nodes T1 through Tn representing the n words of the target sentence while its apex represents the (T1TjTn) sequence of words, i.e. the complete target sentence.

After each source and target sentence is decomposed into a source network and a target network, each node of the source network is put in correspondence with each node of the target network. In fact, relations between nodes are built through bilingual arcs as can be seen on FIG. 4 where only two such arcs (406,408) are drawn for clarity.

The arc 406 links a node representing the source word Si to a node representing the target word Tj. Similarly, the arc 408 links a node representing the source word sequence (S1S2) to a node representing the target word sequence (T1T2T3).

FIG. 5 is an illustration of a network representation with two sentences extracted from a telecommunication bilingual corpus of text. The source sentence is composed of the following eleven source English words:

> an outstanding operational feature used in FSS telecommunication is multiple access The target sentence is composed of the following fourteen target French words:

> l'accès multiple est une caractéristique d'exploitation très importante des télécommunications du SFS The arcs 502, 504 and 506 relate sequences of words in the source and target sentences that are the translation of one another. For example, arc 502 connects the English sequence:

> outstanding operational feature to the French sequence

> caractéristique d'exploitation très importante

The modeling through a network as used in the invention allows for any link between any sequence of consecutive source words with any sequence of consecutive target words. However for achieving a high performance system, it is possible to ignore some links which are not considered as valid.

The selection of those arcs corresponding to valid links is based on a principle which is known in the field of optimization and which consists in finding a minimal-cost flow in a network. The preferred embodiment of the present invention uses the so-called "maximum flow/minimal cost" process as it will be described later. However, it is understood that other network flow processes, such as the "maximum flow" process, could be used for this purpose.

Coming back to FIG. 3, the bilingual word statistics determinator 302 computes statistical scores between individual source words and target works in aligned sentences. Several methods are available in the literature for such purpose, which all consist in accumulating the count of pairs of words occurring in aligned sentences and in computing correlation scores for these pairs of words, as is explained for example in UK Patent Application 2,279,164. The bilingual word statistics will be used in the term extractor 304 described hereafter, and can be updated in an iterative process as described in the description for FIG. 8a below.

The detailed operations performed in the term extractor 304 are now described with reference to FIG. 6. In step 602 a pair of aligned sentences is input from the bilingual corpus of text 208. The term "aligned sentences" refers to a source sentence and the corresponding translated target sentence. The method for aligning the source text with the target text is independent of the claimed method of the invention, and any known alignment methods may be used.

The pair of aligned sentences is then used in step 604 to build a source network and a target network of nodes in the way described previously with reference to FIG. 4.

Bilingual arcs are then established between any node of the source sentence and any node of the target sentence. However, the number and the type of the arcs could vary and be defined as parameters. For example, it is possible to define that no arc is built from those source nodes which represent articles or propositions or other types of source nodes which may be considered as empty words. Others configurations for the building of the arcs can be selected. In a particular embodiment, if a sequence of words such as "parabolic antenna" corresponding to a known expression already stored in database 207, is part of a source sentence that is processed, the system will build an arc from the corresponding source node "parabolic antenna" whereas each of the individual source nodes ("parabolic" and "antenna") will be ignored.

In a preferred embodiment of the invention, a so-called grammar of the type "noun-phrase" is used to identify potential nodes that are grammatically relevant.

Coming back to the example shown on FIG. 5, the noun-phrase "outstanding" operational feature" is identified as a potential node for the building of an arc whereas the individual words "outstanding", "operational" and "feature" are ignored and no arc starting from these word is established.

In the field of optimization, an arc can be characterized by a capacity and the flow asspcoated to it. Although there are several possibilities to define a capacity and a flow, such as in the maximum flow/minimum cost method, the following definitions are retained for the application in the field of language processing:

- the capacity of an arc linking a source node to a target node is the maximum between the size of the source node and the size of the target node, the size of a node being the number of individual words composing said node;
- the value of a flow running in an arc linking a source node to a target node is defined as the sum of statistical word alignment scores between all words in the source node and all words in the target node.

Furthermore, the optimization method used in the preferred embodiment assumes that running a flow in an arc involves a cost; for each arc, the corresponding cost is currently defined as being the product of a constant cost per unit of flow, by the value of the flow in that arc.

Next step 606 consists in optimizing the network flow built for the first pair of bilingual sentences that are processed. The optimal flow resulting from the optimization step will designate certain arcs as he most likely links between the source and target terms in these sentences.

In order to obtain an optimal flow for the two sentences from which relevant candidate of bilingual term pairs can be extracted, the proposed method makes use of algorithms that optimize flows in networks, such as the one described below with reference to FIG. 7.

Figure 6:
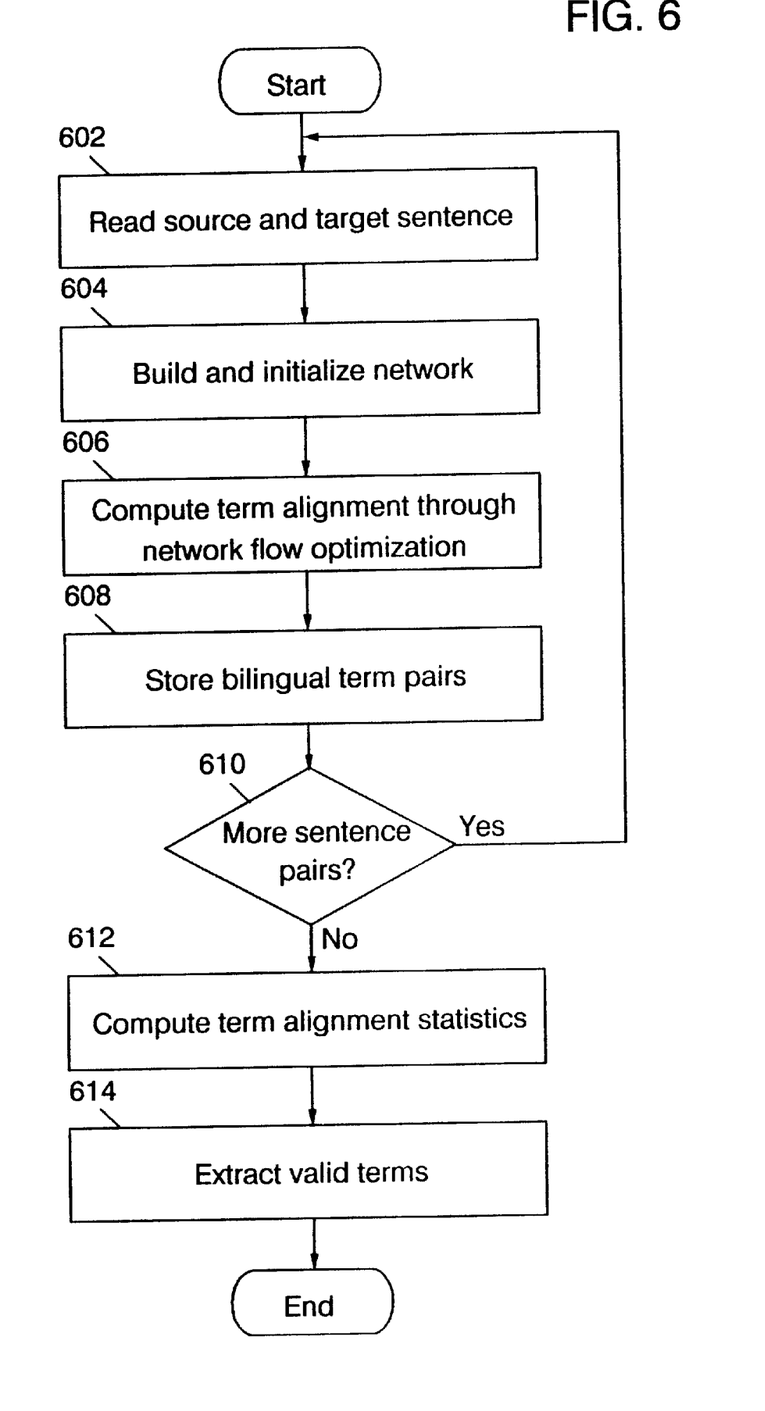
FIG. 6 is a flowchart illustrating part of the operation of the extraction component.

Coming back to FIG. 6 and the operation performed in step 608, the respective terms corresponding to those preferred links identified in step 606 are extracted from the source and target sentences and stored in memory 312. The association score corresponding to the term pair is the final value, after the flow optimization, of the flow running in the arc connecting these terms.

Step 610 ensures that the pocess is iterated over the whole set of aligned bilingual sentences stored in the bilingual sentence database. In step 610, a test is performed to determine if there is another sentence pair to be analyzed. If it is the case the process loops back to step 602 (branch YES), otherwise all pair of sentences have been analyzed and the process proceeds to step 612 (branch NO).

Coming back to FIG. 3, once all pairs of bilingual sentences have been operated through the term extractor 304, the system has accumulated a number of pairs of candidate terms which have been extracted and stored in memory 312. It is the role of the bilingual terms statistic determinator 306 to compute statistics for all these term pairs and decide which can be deemed valid terms.

The detailed operations performed in said bilingual terms statistics determinator 306 are now described with reference to steps 612 and 614 of FIG. 6.

Among the term pairs identified in each iteration and stored in step 608, some term pairs can of course have appeared in several sentence pairs. Step 612 computes statistics on the term pairs, based on parameters such as their number of occurrences in the sentence pairs, and gives each term pair a score which measures term significance; so, for example, those candidates with the best scores are more likely to be relevant terms than those with lower scores. In the preferred embodiment of the present invention, this score is a function of the number of occurrences of the term pair in aligned sentences, and of the number of occurrences of the individual terms (source and target). In particular, the preferred score function as proposed by Ted Dunning is implemented in said first embodiment. For an in-depth discussion of this bilingual score function, see Dunning (T.)—Accurate methods for the statistics of surprise and coincidence, Computational Linguistics, Vol. 19, Number 1, March 1993, herein incorporated by reference.

In step 614, the candidate term pairs are ranked according to the score computed in step 612, and a criterion for deciding which are valid is applied. For example, a threshold score can be determined and those candidates whose score exceeds the threshold are retained as good candidates.

It is understood that various other score and threshold functions may be considered for use in steps 612 and 614.

The results obtained by the operations described in FIG. 6 can be improved by iterating the whole process several times over the entire corpus of text. This will be described below with reference to FIGS. 8a and 8b.

Figure 7:
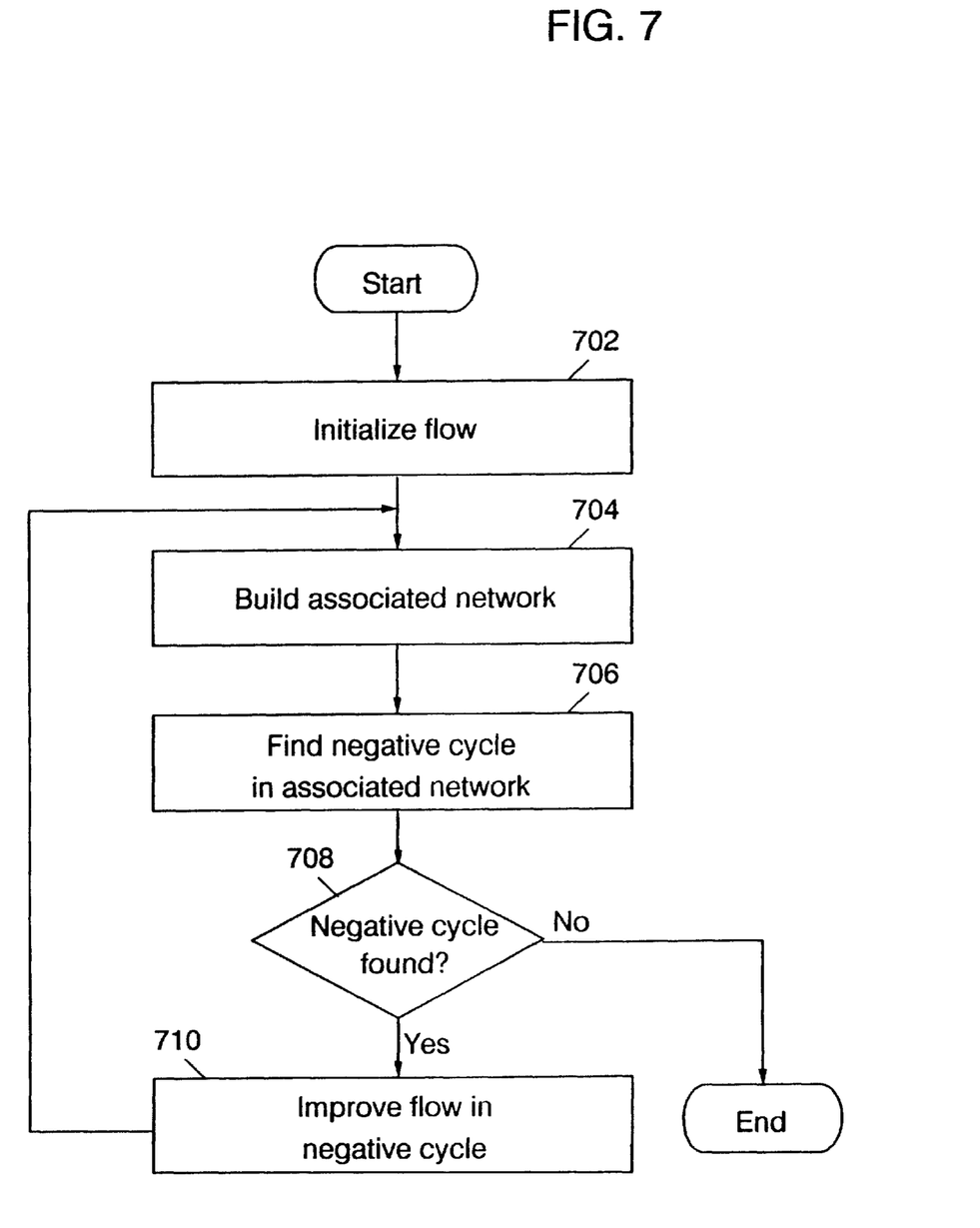
FIG. 7 is a flowchart illustrating the operation performed during the flow optimization process.

FIG. 7 details the operations performed in block function 606 to achieve a network flow optimization. Although different network flow optimization algorithms are possible, namely all those which solve the maximum flow/minimal cost problem, a preferred embodiment of the present invention uses for this purpose the algorithm first described in the paper of Klein. For an in-depth discussion of this algorithm see M. Klein, "A primal method for minimal cost flows, with applications to the assignment and transportation problems", Management Science, 14, 1967, herein incorporated by reference. Only the different basic steps of this algorithm will be presented here.

In first step 702 an initial low is sent through the network.

In next step 704, a parallel network associated to the initial one is built. This second network contains the same nodes and the same arcs as the original network, but the capacity of each arc is computed as being the remaining differential capacity between the original flow and the capacity of the arc, and the cost of running a flow in each arc is either the original cost or its negative value, depending on the direction of the arc.

The core of the Klein's algorithm consists in finding a cycle of arcs having a negative cost in this associated network, which operation is performed in step 706. A cycle of arcs is a sequence of arcs connecting several nodes wherein the last arc of the sequence ends at the first node from which the first arc begins.

If no negative cycle is found (branch NO), which means that the flow is already optimized, the optimization process is ended.

If a negative cycle is found, the overall flow is improved by sending the largest possible flow in said negative cycle (step 710).

The process is then iterated until no negative cycle remains, which means that the resultin flow is optimal.

Those skilled in the art will recognize that the present invention is applicable with other optimization algorithms. The example algorithm cited in the present invention is for illustrative purposes only and is not intended to be exhaustive or to limit the invention.

We have mentioned with reference to FIG. 6 that the whole process described in said Figure can be iterated several times over the entire corpus of text, in order to improve the final selection of relevant bilingual terms pairs. The basic principle is that the final selection of term pairs resulting from an iteration is bein used to modify the initial conditions of the following iteration.

Two instances of such an iterative process will now be described with reference to FIGS. 8a and 8b.

Intuitively, if a strong relation is found between the English term "baseband" and the French term "bande de base", this might suggest that the single word bilingual statistics should reflect some relationship be ween "baseband" and "bande", and also between "baseband" and "base". Thus, the bilingual term alignment statistics obtained through a first iteration of the whole process of FIG. 6 may be used to improve the single word alignment statistics which are used in the optimization step 606. FIG. 8a shows how this feedback operation is implemented to improve the pocess. The single word statistics are computed or loaded from memory in step 802.

In next step 804, the previous results are used during the network optimization operation performed by the bilingual term extractor.

Once bilingual term statistics have been collected for the entire corpus, these can be used to improve the single word statistics in step 808. These improved word statistics are substituted to the original ones.

The process is then iterated until some condition is met (step 806), as for example after a certain number of iterations of the process.

Figure 8A:
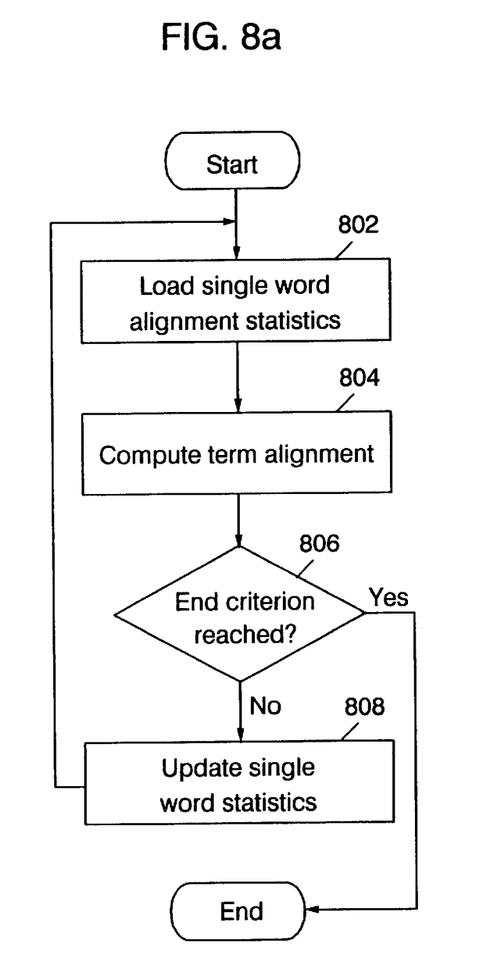
FIGS. 8a and 8b are flowcharts illustrating two embodiments of the operation of repeating he whole term selection process several times over the whole corpus of text.
Figure 8B:
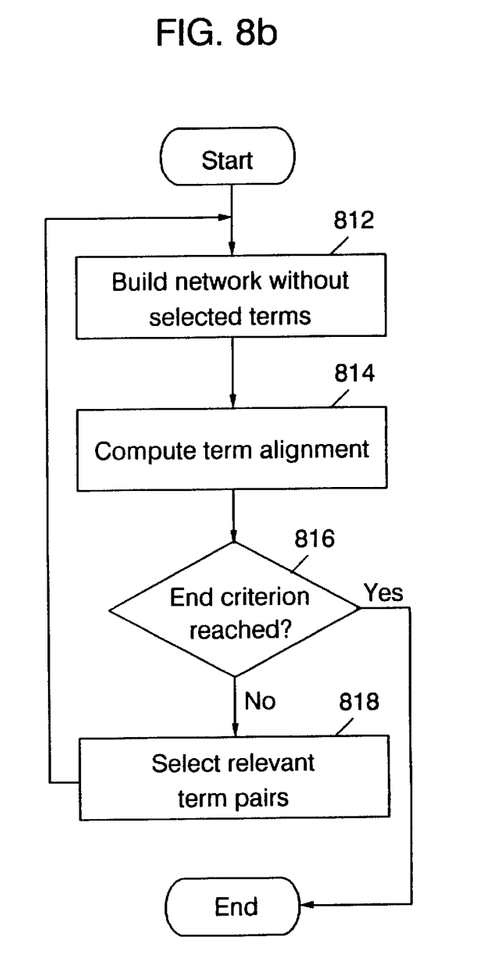

FIG. 8b shows a similar iterative process, whereby the relevant term pairs resulting from one iteration are not used as network nodes during the network building steps in the following iteration, which reduces the space of possible network solutions for a given pair of sentences and therefore improves the quality of the term alignment results.

In step 812, the network building step (similar to step 604 of FIG. 6) ignores those nodes and links which correspond to term pairs that have been selected as relevant at the end of the previous iteration.

Step 814 is equivalent to steps 606 through 610 of FIG. 6, and carries out the remaining of the term extraction process. The new set of relevant term pairs selected in step 818 can be ignored in the following iteration.

The process is then iterated until some condition is met (step 816), as for example after a certain number of terms pairs have been selected, or after the scores of the selected term pairs have reached a certain low threshold.

Both possibilities of iteration of the process, such as have been described in FIGS. 8a and 8b, can be used separately or combined in a single implementation of the invention.

Figures 9, 9A:
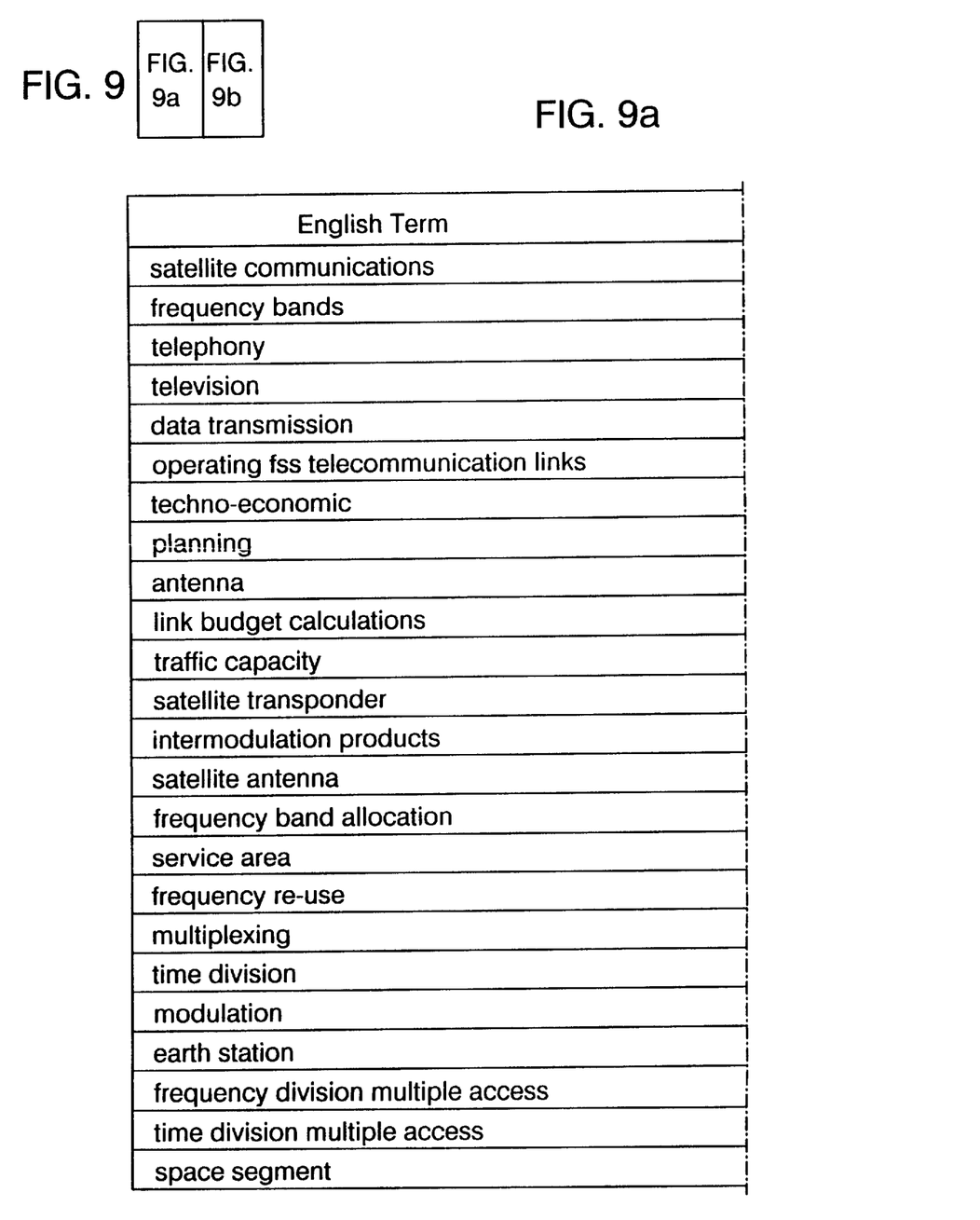
FIG. 9 is a sample of bilingual term pairs obtained in an experimental implementation of the invention.
Figure 9B:
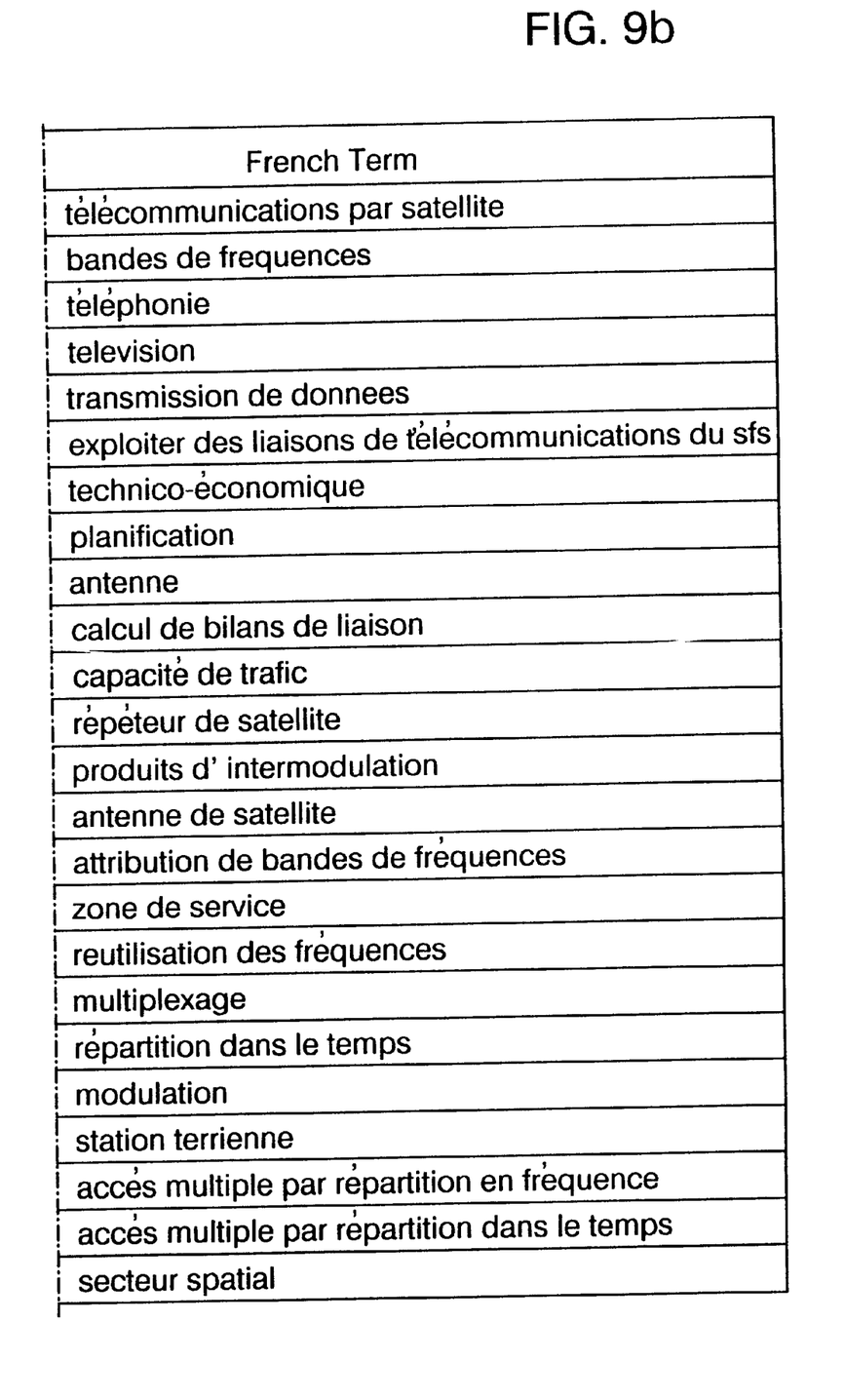

Turning now to FIG. 9, an experiment has been carried out with the proposed embodiment of the present invention on a text corpus consisting of 1000 English sentences aligned with their French translation, resulting in a list of 400 selected term pairs. In a manual evaluation of this list by human judges, nearly 96% of these candidates term pairs were deemed to be correct.

Sample term pairs extracted from that list are shown in FIG. 9.

We claim:

1. A method for creating bilingual terminology from a source text comprising at least one sequence of source terms aligned with a target text comprising at least one sequence of target terms, a term being composed of at least one word, said method comprising the computer implemented steps of:

a) reading a first pair consisting of a source sequence aligned with a target sequence;

b) building a network wherein each node (Si or Tj) comprises at least one term from said first pair of aligned source/target sequences, such that each combination of source terms is included within a different source node and each combination of target terms is included within a different target node;

c) linking each source node (Si) with each target node (Tj) with an arc;

d) computing an association score for each pair of linked source and target nodes;

e) selecting at least one arc performed according to a network flow optimization algorithm such that the corresponding source/target linked terms are considered relevant bilingual terms;

f) storing the relevant bilingual terms;

g) repeating steps a) to f) for all pairs of aligned sequences.

2. The method of claim 1 further comprising after step g) the step of:

h) computing alignment statistics for the stored bilingual terms according to a scoring function;

i) selecting scored bilingual terms as relevant candidates.

3. The method of claim 2 further comprising after step i):

j) using the statistical results of step h) for each pair of source and target terms to improve the single word statistics for those words which compose said terms;

k) updating the association scores used in step d) according to the results of step j);

l) repeating steps a) to k) with the updated single word statistics until an end criterion is met.

4. The method of claim 3 further comprising after step i):

m) repeating steps a) to k) until an end criterion is met, while not taking into account, in the network building step b), those nodes and links associated with terms that have been selected in step i) of the previous iteration.

5. A computer based terminology extraction system for creating bilingual terminology from a source text aligned with a target text, the source text comprising at least one sequence of source terms, the target text comprising at least one sequence of target terms, a term being composed of at least one word, said system comprising:

a term extractor means which operates on at least one pair extracted from the aligned texts and consisting of a source sequence aligned with a target sequence;

a term statistics means coupled to said term extractor means for computing a statistical association score for each pair of source and target terms detected in the whole set of aligned source/target sequences;

a memory means coupled to said term statistics means for storing the scored pairs of source/target terms that are considered relevant bilingual terms;

characterized in that said term extractor means comprises means for building a network of nodes wherein each node includes at least one term from said at least one pair of aligned source/target sequences and each combination of adjacent source terms is a source node of the network and each combination of adjacent target terms forms a target node of the network;

means for linking each source node with each target node with an arc; and means for operating a flow optimization algorithm such that each arc between a source node (Si) and a target node (Ti) is characterized by a capacity and a flow.

6. The system of claim 5, wherein said flow optimization algorithm is a maximum flow/minimum cost algorithm where capacity is maximum between the size of the source node and the size of the target node and a flow with a value remaining in the link that is the statistical alignment scores between all words in the source node and all words in the target node.

7. The system of claim 6, wherein said linking means further comprises means for selecting a group of source nodes not to be linked to target nodes according to predetermined criteria.

8. The system of claim 7, further comprising a word statistics means for computing association scores for each pair of source and target terms wherein said source terms are composed of one word.

9. A computer based terminology extraction system for creating bilingual terminology from a source text aligned with a target text, the source text comprising at least one sequence of source terms, the target text comprising at least one sequence of target terms, a term being composed of at least one word, said system comprising:

a term extractor means which operates on at least one pair extracted from the aligned texts and consisting of a source sequence aligned with a target sequence;

a term statistics means coupled to said term extractor means for computing a statistical association score for each pair of source and target terms detected in the whole set of aligned source/target sequences;

a memory means coupled to said term statistics means for storing the scored pairs of source/target terms that are considered relevant bilingual terms;

characterized in that said term extractor means comprises, means for building a network wherein each node (Si or Tj) comprises at least one term from said at least one pair of aligned source/target sequences, such that each combination of source terms is included within a different source node and each combination of target terms is included within a different target node;

means for linking each source node (Si) with each target node (Tj) with an arc; and means for selecting an arc using a maximum flow/minimum cost optimization algorithm such that each arc between a source node (Si) and a target node (Tj) is characterized by a capacity that is maximum between the size of the source node and the size of the target node and a flow with a value running in the arc that is the statistical word alignment score between all words in the source node and all words in the target node.

10. The system of claim 1 wherein said linking means further comprises means for selecting a group of source nodes not to be linked to target nodes according to predetermined criteria, such as ignoring source nodes already stored in said memory means.

11. The system of claim 10 further comprising a word statistics means for computing association scores for each pair of source and target terms wherein said source terms are composed of one word.

12. A method for creating bilingual terminology from a source text comprising at least one sequence of source terms aligned with a target text comprising at least one sequence of target terms, a term being composed of at least one word, said method comprising the computer implemented steps of:

a) reading a first pair consisting of a source sequence aligned with a target sequence;

b) building a network of nodes wherein each node includes at least one term from said first pair of aligned source/target sequences and each combination of adjacent source terms is a source node and each combination of adjacent target terms is a target node of the network;

c) linking each source node (Si) with each target node (Tj) with an arc;

d) computing an association score for each pair of linked source and target nodes;

e) selecting at least one arc based on the maximum flow/minimum cost optimization algorithm such that the corresponding source/target linked terms are considered relevant bilingual terms wherein the capacity of the arc is the maximum between the size of the source node and the size of the target node and the value of the flow running in the arc is the sum of statistical word alignment scores between all words in the source node and all words in the target node;

f) storing the relevant bilingual terms;

g) repeating steps a) to f) for all pairs of aligned sequences.

13. The method of claim 12, further comprising after step g) the step of:

h) computing alignment statistics for the stored bilingual terms according to a scoring function;

i) selecting scored bilingual terms as relevant candidates.

14. The method of claim 13, further comprising after step i):

j) using the statistical results of step h) for each pair of source and target terms to improve the single word statistics for those words which compose said terms;

k) updating the association scores used in step d) according to the results of step j);

l) repeating steps a) to k) with the updated single word statistics until an end criterion is met.

15. The method of claim 14, further comprising after step i):

m) repeating steps a) to k) until an end criterion is met, while not taking into account, in the network building step b), those node and links associated with terms that have been selected in step i) of the previous iteration.

* * * * *